(12) United States Patent
Mima et al.

(10) Patent No.: US 10,341,502 B2
(45) Date of Patent: Jul. 2, 2019

(54) IMAGE FORMING APPARATUS THAT EXECUTES IMAGE PROCESSING CORRESPONDING TO RESOLUTION

(71) Applicant: CANON KABUSHIKI KAISHA, Tokyo (JP)

(72) Inventors: Naoko Mima, Moriya (JP); Ryou Sakaguchi, Toride (JP); Tadao Sugiura, Moriya (JP); Masashi Yokoyama, Saitama (JP); Shun Motohashi, Misato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/728,322

(22) Filed: Oct. 9, 2017

(65) Prior Publication Data

US 2018/0103157 A1 Apr. 12, 2018

(30) Foreign Application Priority Data

Oct. 11, 2016 (JP) .................. 2016-200407

(51) Int. Cl.
*H04N 1/00* (2006.01)

(52) U.S. Cl.
CPC ....... *H04N 1/00037* (2013.01); *H04N 1/0009* (2013.01); *H04N 1/00018* (2013.01);
(Continued)

(58) Field of Classification Search
CPC ........... G03G 15/5058; G06K 15/1849; G06K 15/1855; H04N 1/00015; H04N 1/00023;
(Continued)

(56) References Cited

U.S. PATENT DOCUMENTS 5,995,802 A * 11/1999 Mori ............... H04N 1/047
399/394
8,731,420 B2 * 5/2014 Yoshida ........... H04N 1/00885
358/1.13
(Continued)

FOREIGN PATENT DOCUMENTS

CN 104917916 A 9/2015
CN 105323407 A 2/2016
JP 200889701 A 4/2008

*Primary Examiner* — Negussie Worku
(74) *Attorney, Agent, or Firm* — Canon U.S.A., Inc. IP Division

(57) ABSTRACT

An image forming apparatus includes an obtaining unit configured to obtain information related to a resolution of an image to be formed, an image processing unit configured to execute image processing corresponding to the information on image data, an image forming unit configured to form an image based on the image data on which the image processing is executed by the image processing unit, an intermediate transfer member to which a measuring image formed by the image forming unit is transferred, a measurement unit configured to measure the measuring image transferred to the intermediate transfer member, a storage unit configured to store measuring image data, and a controller configured to control the image processing unit to execute first image processing on the measuring image data, control the image forming unit to form the measuring image, control the measurement unit to measure the measuring image, and control an image forming condition.

20 Claims, 9 Drawing Sheets

(52) U.S. Cl.
CPC ..... *H04N 1/00021* (2013.01); *H04N 1/00034* (2013.01); *H04N 1/00092* (2013.01); *H04N 1/00912* (2013.01); *H04N 1/0001* (2013.01)

(58) Field of Classification Search
CPC .......... H04N 1/00031; H04N 1/00045; H04N 1/00053; H04N 1/00063; H04N 1/00087; H04N 1/0009; H04N 1/405; H04N 1/4078
USPC ....... 399/49, 301, 72, 27, 302, 66, 121, 124, 399/30, 46, 55, 56, 60, 12, 127, 159, 160, 399/162, 169, 235, 258, 303, 313, 314, 399/39, 40, 44, 48, 53, 68, 69, 74, 75, 9, 399/94; 358/1.9, 3.06, 406, 518, 1.13, 358/1.14, 1.15, 300, 3.1, 3.14, 3.23, 3.28, 358/3.3, 443, 446, 488, 498
See application file for complete search history.

(56) References Cited

U.S. PATENT DOCUMENTS

| | | | |
|---|---|---|---|
| 8,971,740 B2* | 3/2015 | Harashima | G03G 15/205 399/49 |
| 9,729,760 B2* | 8/2017 | Negishi | H04N 1/6033 |
| 9,819,826 B2* | 11/2017 | Sekiya | H04N 1/2346 |
| 9,915,905 B2* | 3/2018 | Morimoto | G03G 15/556 |
| 10,044,894 B2* | 8/2018 | Omura | H04N 1/00411 |
| 2002/0054302 A1 | 5/2002 | Nakamura | |
| 2008/0247770 A1 | 10/2008 | Morales | |
| 2012/0105881 A1* | 5/2012 | Fukaya | H04N 1/00031 358/1.9 |
| 2012/0327480 A1* | 12/2012 | Yamane | H04N 1/00015 358/3.06 |
| 2012/0328310 A1* | 12/2012 | Ohashi | G03G 15/0131 399/39 |
| 2014/0064800 A1* | 3/2014 | Sato | G03G 15/0189 399/301 |
| 2014/0079443 A1* | 3/2014 | Nanai | G03G 15/5058 399/301 |
| 2015/0117912 A1* | 4/2015 | Kamiyama | G03G 15/0131 399/301 |
| 2015/0301468 A1* | 10/2015 | Adachi | G03G 15/0142 399/301 |
| 2016/0147175 A1* | 5/2016 | Ohkubo | G03G 15/0189 399/301 |
| 2017/0052468 A1* | 2/2017 | Omura | G03G 15/0131 |
| 2017/0123340 A1* | 5/2017 | Sobue | G03G 15/01 |
| 2017/0205750 A1* | 7/2017 | Takahashi | G03G 15/0131 |
| 2018/0017903 A1* | 1/2018 | Taniguchi | G03G 15/5008 |
| 2018/0103157 A1* | 4/2018 | Mima | H04N 1/00092 |

* cited by examiner

PIXEL OF INTEREST

| 0 | 0 | 0 | 0 | 0 |
|---|---|---|---|---|
| 0 | 0 | 0 | 1 | 1 |
| 0 | 0 | 1 | 1 | 1 |
| 0 | 1 | 1 | 1 | 1 |
| 0 | 1 | 1 | 1 | 1 |
| 0 | 1 | 1 | 1 | 1 |

PIXEL OF INTEREST

| 0 | 0 | 0 | 1 | 1 |
|---|---|---|---|---|
| 0 | 1 | 3 | 4 | 4 |
| 0 | 4 | 4 | 4 | 4 |

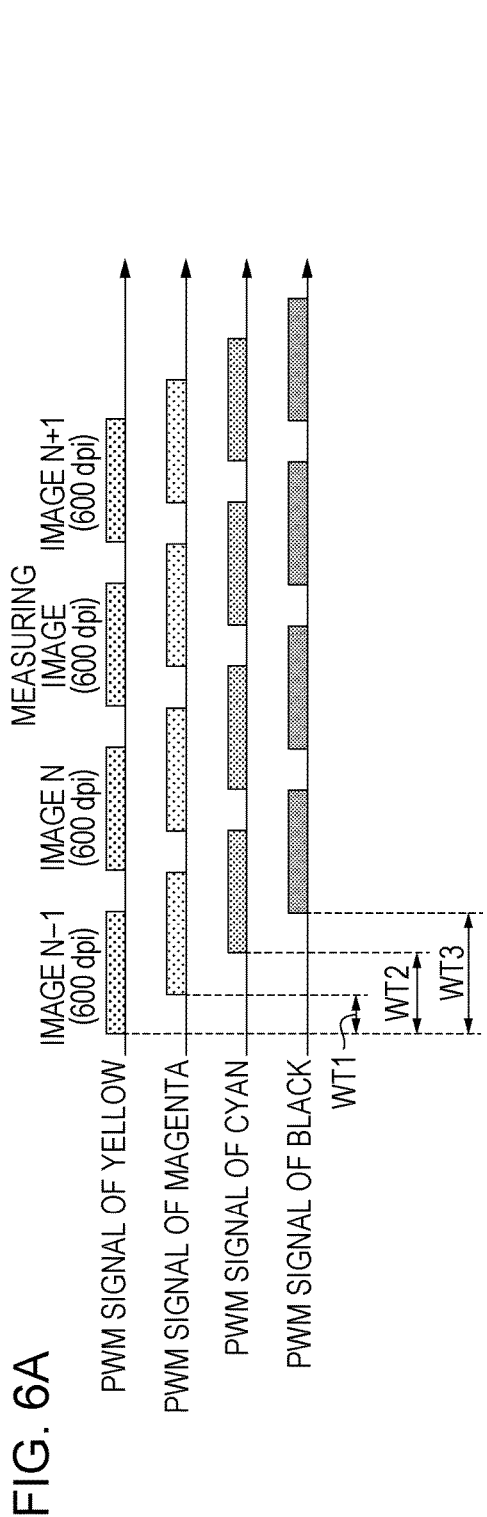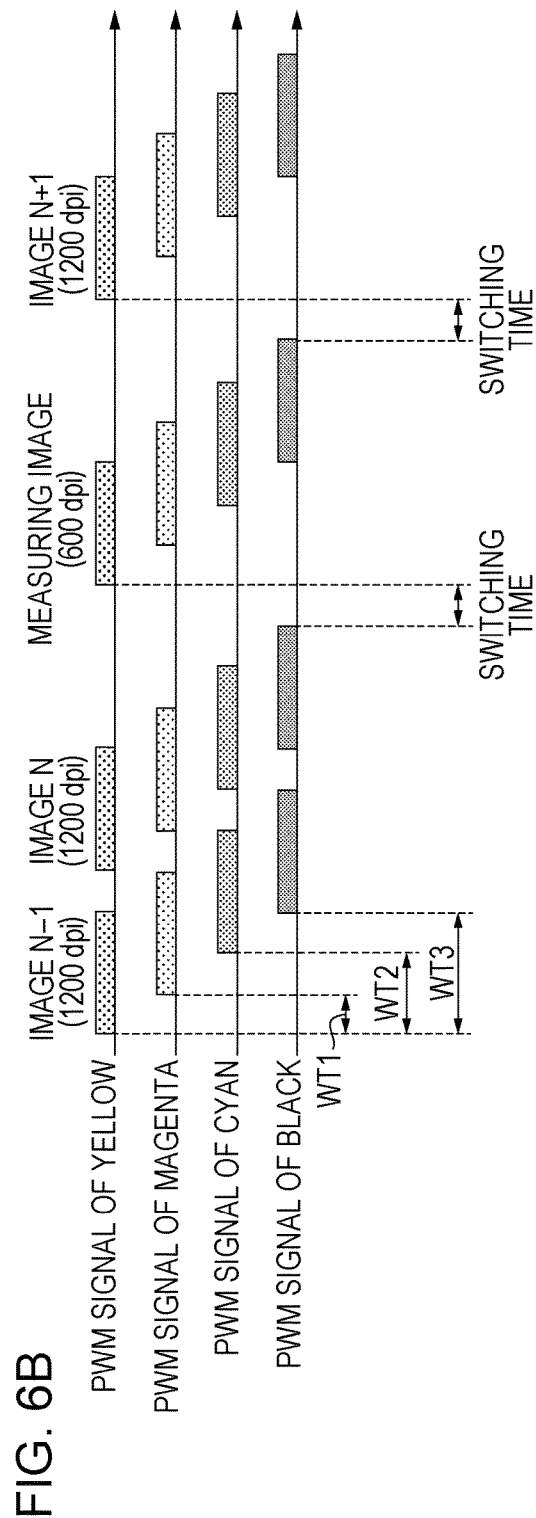

IMAGE FORMING APPARATUS THAT EXECUTES IMAGE PROCESSING CORRESPONDING TO RESOLUTION

BACKGROUND

Field of the Disclosure

The present disclosure relates to timing control for executing calibration for correcting a quality of an image formed by an image forming apparatus.

Description of the Related Art

An image forming apparatus of an electrophotographic method is provided with image forming units for respective colors and can form a full color image by overlapping images formed by the respective image forming units with one another. The image forming apparatus forms a measuring image on an image bearing member to compensate a quality of an output image and measures the measuring image by a sensor. The image forming apparatus adjusts an image forming condition for adjusting a density of the image and corrects a misregistration of a formation position for the image of each color on the basis of the measurement result.

In recent years, an image forming apparatus that can print images having a plurality of resolutions has been proposed. For example, the above-described image forming apparatus selects a resolution on the basis of image data transferred from a personal computer (PC) or the like and executes image processing corresponding to the resolution on the image data to print an image corresponding to the image data.

In a case where the image forming apparatus that forms the images having the plurality of resolutions adjusts the above-described image forming condition, there is a possibility that the density of the image of each of the resolutions does not become a target density. For this reason, to adjust the image forming condition for each of the plurality of resolutions, an image recording apparatus described in Japanese Patent Laid-Open No. 2008-89701 reads out measuring image data that varies for each resolution from a storage unit and forms a measuring image appropriate to each resolution.

SUMMARY

An image forming apparatus according to an aspect of the present disclosure includes an obtaining unit configured to obtain information related to a resolution of an image to be formed by the image forming apparatus, an image processing unit configured to execute image processing corresponding to the information on image data, an image forming unit configured to form an image based on the image data on which the image processing is executed by the image processing unit, an intermediate transfer member to which a measuring image formed by the image forming unit is transferred, a measurement unit configured to measure the measuring image transferred to the intermediate transfer member, a storage unit configured to store measuring image data; and a controller configured to control the image processing unit to execute first image processing on the measuring image data stored in the storage unit, control the image forming unit to form the measuring image based on the measuring image data on which the first image processing is executed by the image processing unit, control the measurement unit to measure the measuring image, and control an image forming condition for adjusting a density of an image to be formed by the image forming unit based on a measurement result of the measurement unit, in which the controller controls the image processing unit to execute the first image processing on the measuring image data stored in the storage unit and controls the image forming unit to form the measuring image in a case where a number of sheets reaches a predetermined number of sheets while the image forming unit continuously forms a plurality of images based on other image data on which second image processing is executed by the image processing unit.

Further features of the present disclosure will become apparent from the following description of exemplary embodiments with reference to the attached drawings.

BRIEF DESCRIPTION OF THE DRAWINGS

FIGS. 6A and 6B are timing charts for calibration executed during image formation according to one or more aspects of the present disclosure.

DESCRIPTION OF THE EMBODIMENTS

Image Forming Apparatus

Figure 1:
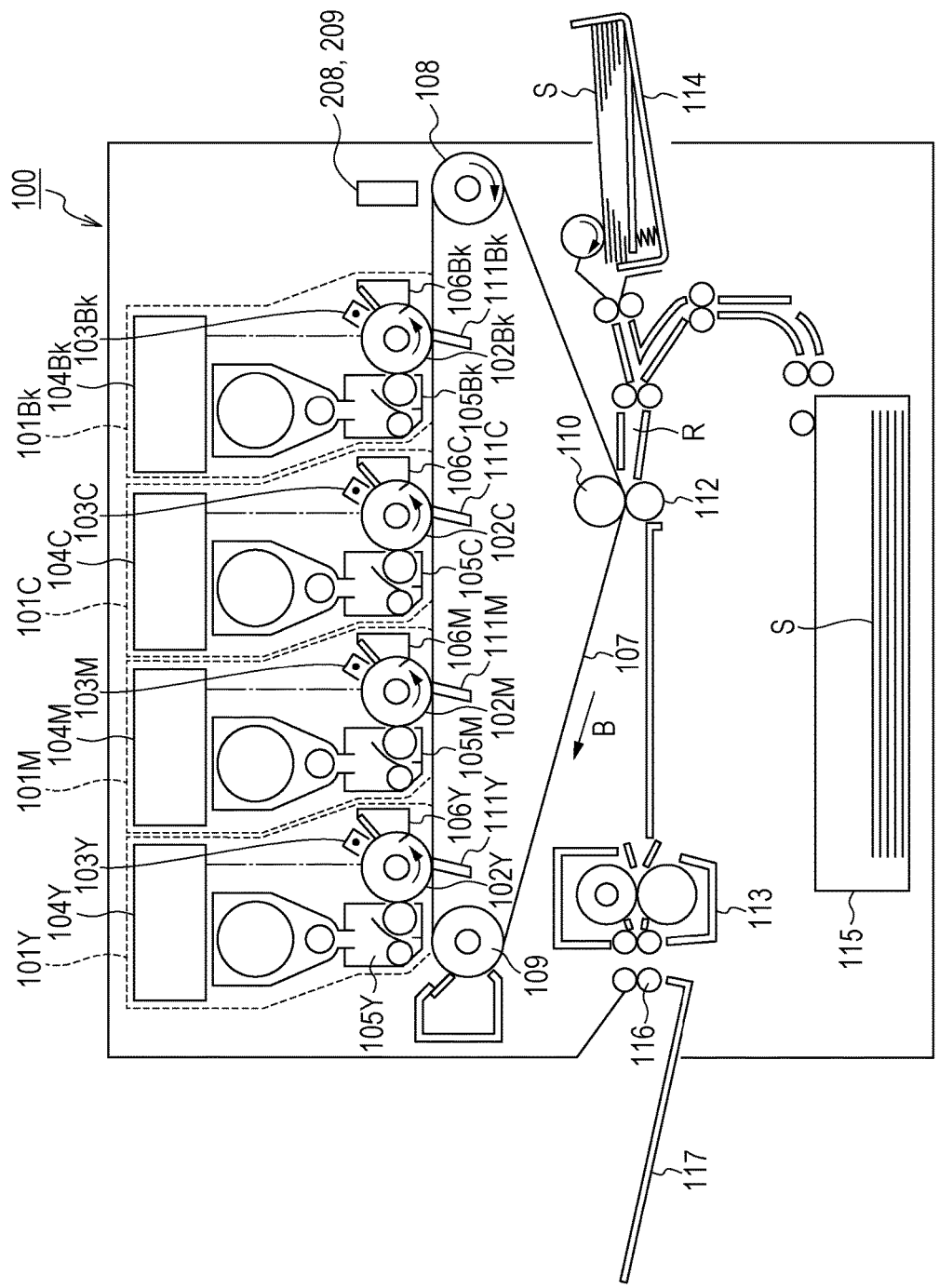
FIG. 1 is a schematic cross sectional view of an image forming apparatus according to one or more aspects of the present disclosure.

FIG. 1 is a cross sectional view illustrating a schematic configuration of an image forming apparatus according to one or more aspects of the present disclosure. The image forming apparatus is a digital full color printer (color image forming apparatus) configured to form an image by using toner of a plurality of colors. Furthermore, an image forming apparatus 100 is configured to have a first image forming mode in which the image is formed on the basis of image data at 600 dpi and a second image forming mode (high resolution mode) in which the image is formed on the basis of the image data at 1200 dpi.

In FIG. 1, the image forming apparatus 100 is provide with an image forming unit 101Y configured to form a yellow image, an image forming unit 101M configured to form a magenta image, an image forming unit 101C configured to form a cyan image, and an image forming unit 101Bk configured to form a black image. Herein, Y, M, C, and Bk respectively represent components corresponding to the respective colors of yellow, magenta, cyan, and black. The image forming units 101Y, 101M, 101C, and 101Bk respectively form toner images of the corresponding colors by respectively using toner of yellow, magenta, cyan, and black.

The image forming units 101Y, 101M, 101C, and 101Bk are provided with photosensitive drums 102Y, 102M, 102C, and 102Bk respectively functioning as photosensitive members. Charging apparatuses 103Y, 103M, 103C, and 103Bk and laser scanners 104Y, 104M, 104C, and 104Bk are respective provided in the vicinity of the photosensitive drums 102Y, 102M, 102C, and 102Bk. In addition, development apparatuses 105Y, 105M, 105C, and 105Bk and drum cleaning apparatuses 106Y, 106M, 106C, and 106Bk are respectively arranged so as to correspond to the photosensitive drums 102Y, 102M, 102C, and 102Bk.

An intermediate transfer belt 107 as an intermediate transfer member is arranged below the image forming units 101Y, 101M, 101C, and 101Bk. The intermediate transfer belt 107 is stretched over a driving roller 108 and driven rollers 109 and 110 and rotates in an arrow direction B in FIG. 1 during the image formation. Primary transfer apparatuses 111Y, 111M, 111C, and 111Bk are respectively provided at locations facing the photosensitive drums 102Y, 102M, 102C, and 102Bk through the intermediate transfer belt 107. In addition, a secondary transfer roller 112 is provided so as to face the driven roller 110 through the intermediate transfer belt 107. The secondary transfer roller 112 performs application of a transfer bias to transfer a toner image on the intermediate transfer belt 107 to a sheet S serving as a recording medium. A feeding cassette 115 and a manual feeding cassette 114 that contain the sheet S are arranged below the intermediate transfer belt 107. The sheet S contained in the feeding cassette 115 and a manual feeding cassette 114 is supplied to the secondary transfer part against which the driven roller 110 and the secondary transfer roller 112 abut via a conveyance path R. A fixing apparatus 113 is provided on a downstream side of a secondary transfer part in the conveyance path R. The fixing apparatus 113 is configured to fix a toner image transferred to the sheet S onto the sheet S.

The image forming apparatus 100 also includes a sensor 208 configured to measure a measuring image to correct the density of the image formed by the image forming apparatus 100 with respect to the intermediate transfer belt 107. The sensor 208 is an optical sensor including a light transmitting unit and a light receiving unit. When the number of formed sheets reaches a first number, the image forming apparatus 100 forms the measuring image on the intermediate transfer belt 107 and adjusts an image forming condition for adjusting the densities of the images formed by the image forming units 101Y, 101M, 101C, and 101Bk on the basis of the measurement result of the measuring image by the sensor 208. The image forming condition includes, for example, a light intensity of laser light emitted from the laser scanner, a value of a high voltage supplied to the development apparatus 105 and the charging apparatus 103, and the like.

In addition, the image forming apparatus 100 includes a sensor 209 configured to detect a relative positional misregistration of the images of the respective colors formed by the image forming units 101Y, 101M, 101C, and 101Bk (hereinafter, which will be referred to as an amount of color misregistration). The sensor 209 is an optical sensor including a light transmitting unit and a light receiving unit. When the number of formed sheets reaches a second number, the image forming apparatus 100 forms a color misregistration detection image on the intermediate transfer belt 107 and corrects writing start positions of the respective image forming units 101Y, 101M, 101C, and 101Bk on the basis of the detection result of the color misregistration detection image (color pattern) by the sensor 209. In a case where the writing start positions of the respective image forming units 101Y, 101M, 101C, and 101Bk are corrected, for example, the image data transferred to the laser scanner 104 is corrected, or a light emitting timing of the laser light of the laser scanner 104 is adjusted.

Figure 2:
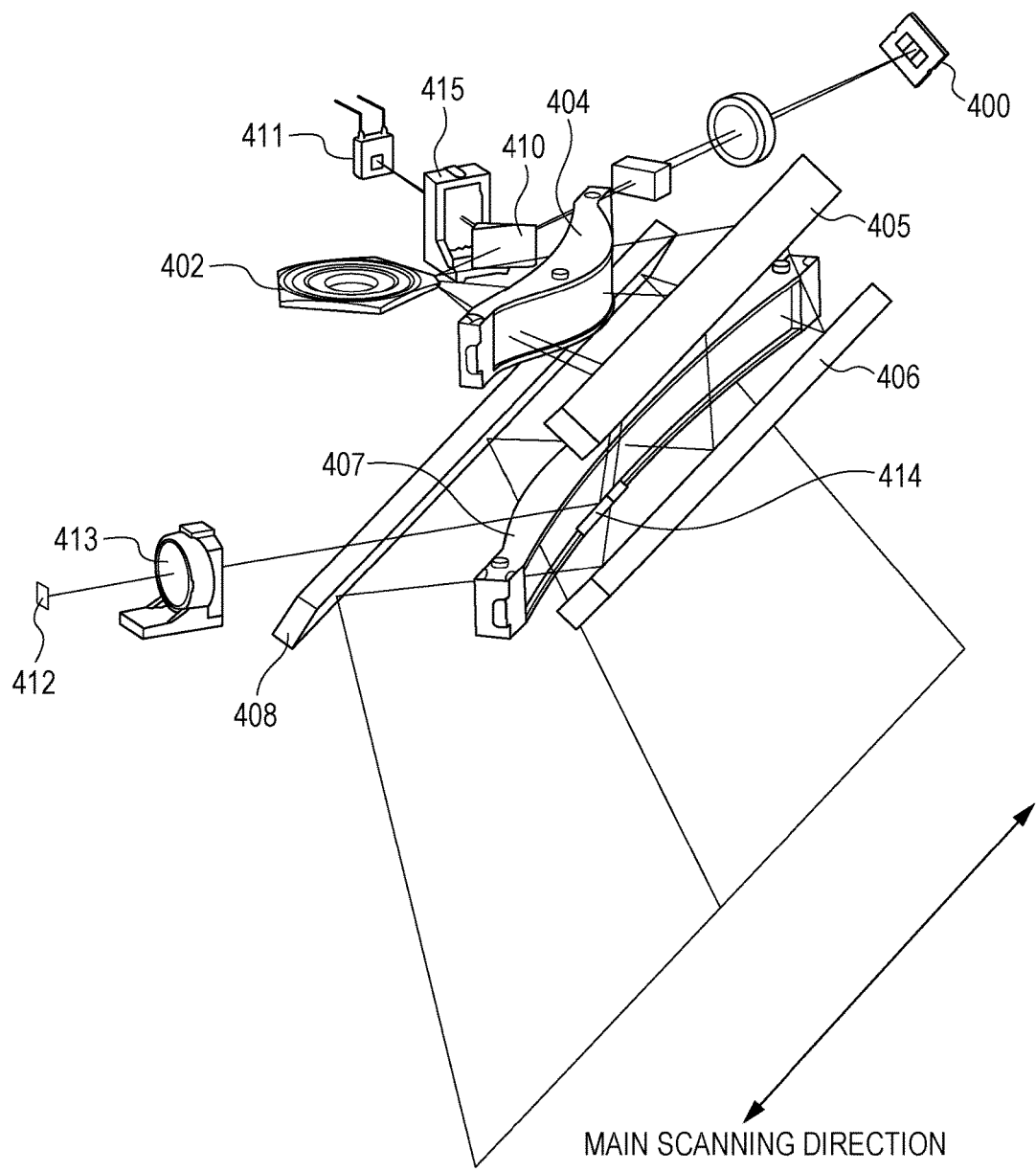
FIG. 2 is a main part perspective view of an exposure apparatus according to one or more aspects of the present disclosure.

FIG. 2 is a main part perspective view illustrating a main configuration of the laser scanner 104 applied to the image forming apparatus of FIG. 1. A polygon mirror 402 is contained in the laser scanner 104. The polygon mirror 402 functions as a rotating polygon mirror that deflects laser light (light beam) output from a light source 400 so as to scan the photosensitive drum that is not illustrated in FIG. 2 in a predetermined direction. In the following description, a direction in which the laser light output from the laser scanner 104 scans the photosensitive drum will be referred to as a main scanning direction, and a direction in which the surface of the photosensitive drum 102 moves will be referred to as a sub scanning direction.

A polygon motor (not illustrated) functioning as a driving source of the polygon mirror 402 is integrally provided to the polygon mirror 402. The polygon motor rotates the polygon mirror 402. A beam splitter 410 is arranged on an optical path between the light source 400 and the polygon mirror 402. A first fθ lens 404, a reflection mirror 405, a reflection mirror 406, a second fθ lens 407, a reflection mirror 408, and dust-proof glass (not illustrated) are arranged on an optical path of first light beam that transmits through the beam splitter 410 and is deflected by the polygon mirror 402. The first fθ lens 404 is disposed so as to be closer to the polygon mirror 402 than the second fθ lens 407. Light beam reflected by the reflection mirror 408 transmits through the dust-proof glass, and the photosensitive drum that is not illustrated in the drawing is irradiated with the light beam. On the other hand, a condenser lens 415 and a photodiode (PD) 411 functioning as a photoelectric conversion element (light receiving unit) are arranged on an optical path of second light beam that is reflected by the beam splitter 410.

The laser scanner is further provided with a beam detector (hereinafter, which will be referred to as "BD") 412 configured to generate a synchronization signal for determining an output timing of the light beam on the basis of the image data and a BD lens 413 attached to the BD 412.

With the above-described configuration, the light beam output from the light source 400 is incident on the beam splitter 410. The light beam incident on the beam splitter 410 is split into first light beam corresponding to transmitted light and second light beam corresponding to reflected light. The first light beam is deflected by the polygon mirror 402, and the photosensitive drum that is not illustrated in the drawing is irradiated with the first light beam at a uniform angle velocity via the first fθ lens 404, the reflection mirror 405, the reflection mirror 406, the second fθ lens 407, the reflection mirror 408, and the dust-proof glass. That is, the light beam scanned at the uniform angle velocity by the polygon mirror 402 passes through the first fθ lens 404 and the second fθ lens 407 and scans the photosensitive drum at a uniform velocity so that imaging is performed, and an electrostatic latent image is formed on the surface of the photosensitive drum. At this time, part of the first light beam passes through the first fθ lens 404 and is reflected by the reflection mirror 405, and a BD mirror 414. Then, the part of the first light beam passes through the BD lens 413 corresponding to an optical system composed of a plurality of lens to be incident on the BD 412. The BD 412 functions as a detection unit. The BD 412 detects a scanning timing of the light beam on the basis of the incident light beam and outputs a BD signal indicating a reference timing for starting image creation.

On the other hand, the second light beam passes through the condenser lens 415 and is then incident on the photodiode (PD) 411. The PD 411 outputs a detection signal in accordance with the amount of received light and performs automatic power control (APC) on the basis of the output detection signal.

Figure 3:
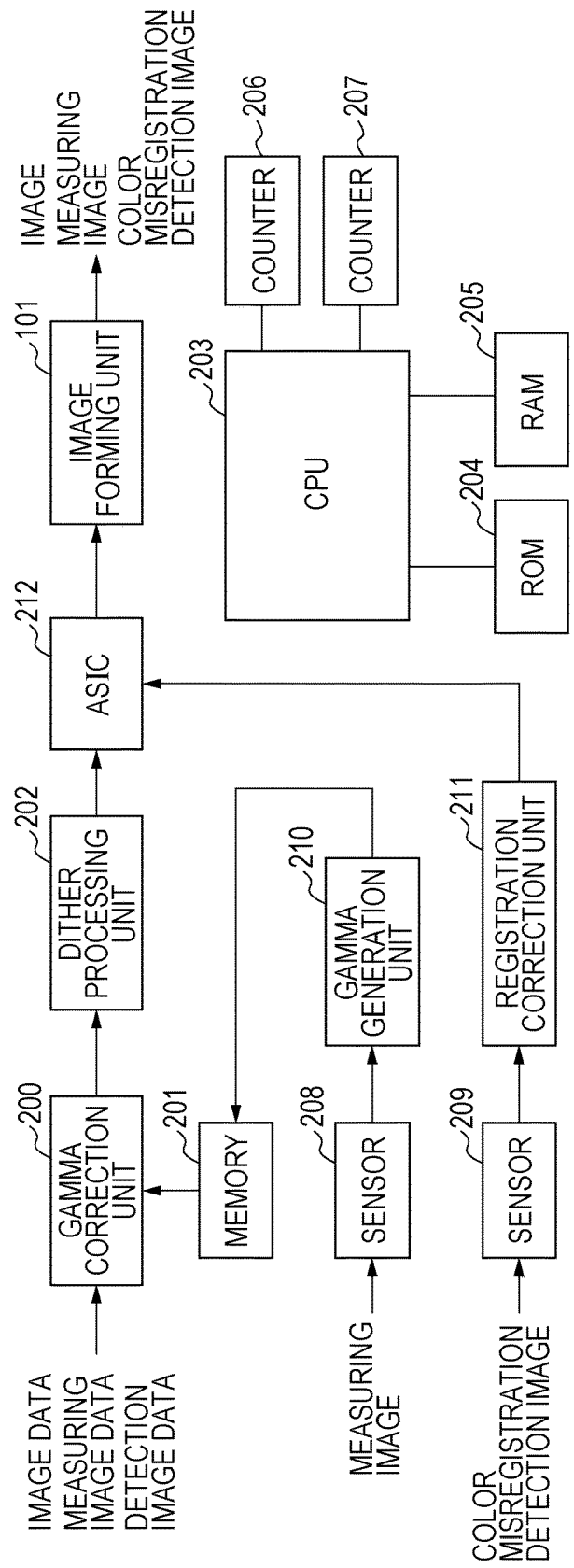
FIG. 3 is a control block diagram of the image forming apparatus according to one or more aspects of the present disclosure.

Next, a control block diagram of the image forming apparatus will be described with reference to FIG. 3. A central processing unit (CPU) 203 is a control circuit configured to control each of the units. Image data from an external apparatus such as the scanner or the PC and information related to a resolution of the image data are input to the image forming apparatus 100 according to one or more aspects of the present disclosure. The CPU 203 selects the image forming mode (resolution) on the basis of the information related to the resolution and controls a dither processing unit 202 and an application specific integrated circuit (ASIC) 212 in a mode corresponding to the image forming mode. It should be noted that a configuration may also be adopted in which the information related to the resolution of the output image is selected by a user from an operation unit that is not illustrated in the drawing. In a case where this configuration is adopted, the CPU 203 selects the image forming mode (resolution) on the basis of set information related to the resolution and controls the dither processing unit 202 and the ASIC 212 in the mode corresponding to the resolution.

A ROM 204 stores various programs. Furthermore, the ROM 204 stores measuring image data for forming the measuring image and detection image data for forming the color misregistration detection image. A RAM 205 is a system work memory. The image forming apparatus 100 further includes counters 206 and 207 configured to count the number of formed sheets. A memory 201 stores a look-up table for correcting tone characteristics (hereinafter, which will be referred to as γLUT). The image forming unit 101 corresponds to the image forming units 101Y, 101M, 101C, and 101Bk of FIG. 1. Since the image forming unit 101, the sensor 208, and the sensor 209 have been already described, descriptions thereof will be omitted here.

A gamma (γ) correction unit 200 corrects the tone characteristics of the image formed by the image forming unit 101 on the basis of the image data to ideal tone characteristics. At this time, a density of the image formed by the image forming apparatus is not set as a desired density because of an evenness or the like in a sensitivity of the photosensitive drum 102 or a light intensity of the laser scanner 104. In view of the above, the gamma correction unit 200 corrects such an input value of the image data (image signal value) that the density of the image formed by the image forming apparatus is set as the desired density. The gamma correction unit 200 corrects the tone characteristics of the image data on the basis of the γLUT stored in the memory 201. It should be noted that the memory 201 stores the γLUT for each of color components. The γLUT is equivalent to a tone correction table for correcting the input value of the image data. It should be noted that the gamma correction unit 200 is configured to convert the image signal value on the basis of the γLUT in the above-described explanation, but a conversion equation for converting the image signal value, for example, may be used instead of the γLUT.

The dither processing unit 202 applies screening to the image data corrected by the gamma correction unit 200. As a result, for example, the application of the screening is performed by using a screen such that a character area is clearly printed.

Figure 4:
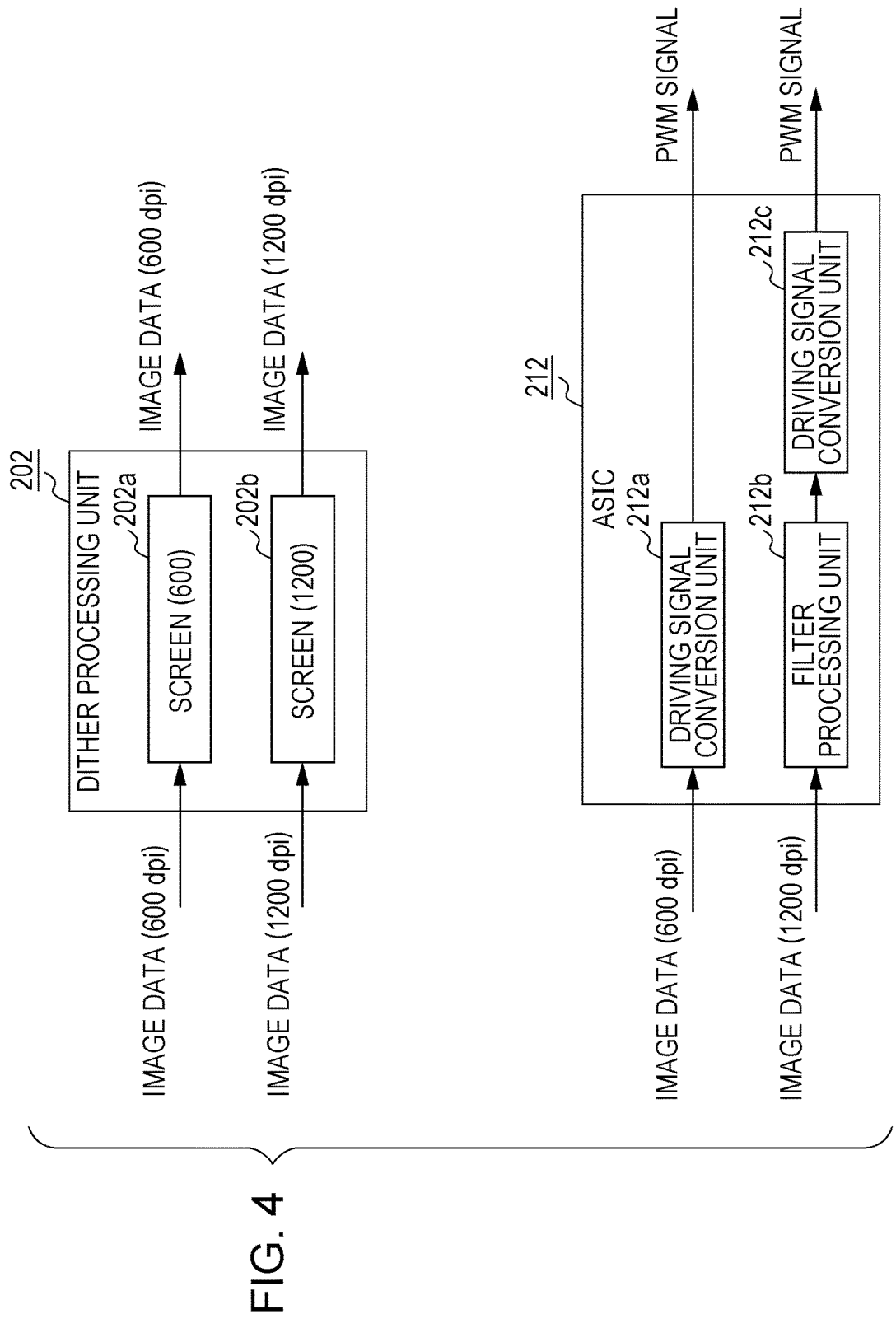
FIG. 4 is a function block diagram of a dither processing unit and an application specific integrated circuit (ASIC) according to one or more aspects of the present disclosure.

FIG. 4 is a functional block diagram of the dither processing unit 202 according to one or more aspects of the present disclosure. In a case where the image data having 600 dpi is transferred, a screen 202*a* corresponding to 600 dpi is used to perform the screening by the dither processing unit 202. The screen 202*a* is a dither matrix for converting the 8-bit image signal value into the 4-bit signal value, for example. In a case where the image data having 1200 dpi is transferred, a screen 202*b* corresponding to 1200 dpi is used to perform the screening by the dither processing unit 202. The screen 202*b* is a dither matrix for converting the 8-bit image signal value into the 1-bit signal value, for example. It should be noted that, since the screening is an already proposed technology, descriptions thereof will be omitted. The dither processing unit 202 functions as an image processing unit configured to execute the image processing appropriate to the resolution of the output image.

The image data to which the screening is applied by the dither processing unit 202 is transferred to the ASIC 212. The ASIC 212 converts the signal value of the image data to which the screening is applied into a pulse width modulation (PWM) signal. It should be noted that the PWM signal is a driving signal for controlling an exposure time of the light source 400.

FIG. 4 is a functional block diagram of the ASIC 212 according to one or more aspects of the present disclosure. In a case where the image signal value converted from the image data having 600 dpi is input in the dither processing unit 202, a driving signal conversion unit 212*a* converts the image signal value into the PWM signal in the ASIC 212. The driving signal conversion unit 212*a* refers to a conversion table for the first image forming mode and converts the 4-bit image signal value into the PWM signal. In a case where the image signal value converted from the image data having 1200 dpi is input in the dither processing unit 202, a filter processing unit 212*b* applies thinning-out processing to the image signal value in the ASIC 212. Thereafter, a driving signal conversion unit 212*c* converts the image signal value into the PWM signal. The filter processing unit 212*b* generates the 3-bit image signal value from the 1-bit image signal value. The driving signal conversion unit 212*c* refers to a conversion table for the second image forming mode and converts the 3-bit image signal value into the PWM signal. The ASIC 212 functions as an image processing unit configured to execute image processing appropriate to the resolution of the output image.

Figures 5A, 5B, 5C:
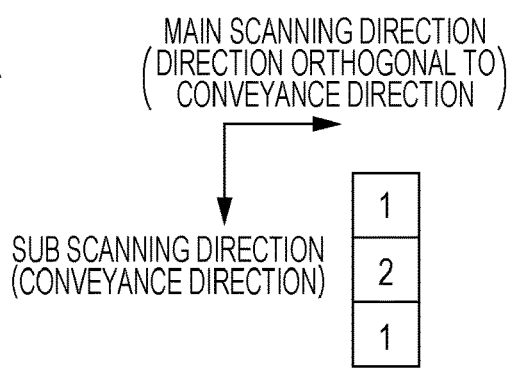
FIGS. 5A to 5C are schematic diagrams for describing filter processing according to one or more aspects of the present disclosure.

Here, the thinning-out processing executed by the filter processing unit 212*b* will be described with reference to FIGS. 5A to 5C. FIG. 5A illustrates conversion coefficients for converting the signal value of the image data (1 bit) by the filter processing. FIG. 5B is a schematic diagram of the 1-bit (binary) image signal value. FIG. 5C is a schematic diagram of the 3-bit image data after the application of the thinning-out processing. The image forming apparatus 100 according to one or more aspects of the present disclosure has a configuration different from the configuration in which the rotating speed of the photosensitive drum is reduced to form the high resolution image. The image forming apparatus artificially forms the high resolution image by thinning out the image signal value in the sub scanning direction orthogonal to the main scanning direction. Furthermore, in a case where the image signal value is thinned out, the ASIC 212 distributes signal values of other pixels adjacent to a pixel of interest to a signal value of the pixel of interest and generates the image data for artificially forming the high resolution image. Subsequently, the filter processing unit 212*b* thins out the other pixels adjacent to the pixel of interest in the sub scanning direction.

For example, in a case where a signal value of a circled pixel of interest in FIG. 5B is 1, and also image signal values of the other pixels adjacent to the pixel of interest are 0 and 1, the filter processing unit 212*b* converts the signal value of the pixel of interest into 3 as illustrated in FIG. 5C. That is, the coefficients illustrated in FIG. 5A and the signal values of the respective pixels are multiplied by each other, the value obtained by summing up all the values is set as the signal value after the conversion. In the case of the example of FIG. 5B, the value is set as 1×0+2×1+1×1=3. As a result, the filter processing unit 212*b* generates the 3-bit image signal value from the 1-bit image signal value.

The control block diagram will be described again with reference to FIG. 2. The PWM signal value converted by the ASIC 212 is input to the light source 400 of the image forming unit 101. The light source 400 emits light on the basis of the exposure timing and exposure time based on the PWM signal. As a result, the electrostatic latent image is formed on the photosensitive drum, and the electrostatic latent image is developed to form the image.

A gamma (γ) generation unit 210 generates the γLUT on the basis of the measurement result of the measuring image on the intermediate transfer belt 107. The image forming unit 101 forms the measuring image on the basis of the measuring image data stored in the ROM 204. The γLUT generated by the gamma generation unit 210 is stored in the memory 201 and read out by the gamma correction unit 200 at the time of the next image formation. It should be noted that a method of generating the γLUT has been already proposed, and descriptions thereof will be omitted here.

A registration correction unit 211 determines a correction amount of color misregistration on the basis of the detection result related to the amount of color misregistration of the color misregistration detection image on the intermediate transfer belt 107 and corrects writing start timings of the respective image forming units 101 on the basis of the correction amount of color misregistration. A method of correcting the writing start timings has been already proposed, and descriptions thereof will be omitted herein. It should be noted that the image forming unit 101 forms the color misregistration detection image on the basis of the detection image data stored in the ROM 204.

Calibration Timing

Transfer timings of the PWM signals in a case where the measuring image is formed while the image formation onto the recording material is performed will be described with reference to FIGS. 6A and 6B. FIG. 6A is a timing chart of the PWM signals transferred to the laser scanner 104 in the first image forming mode. FIG. 6B is a timing chart of the PWM signals transferred to the laser scanner 104 in the second image forming mode. It should be noted that a reason why the transfer timings of the PWM signals vary for the respective colors is that the images of the respective colors are overlapped on the intermediate transfer belt 107 to be transferred in a case where the full color image is formed. That is, intervals WT1, WT2, and WT3 are determined on the basis of distances between a transfer position to the intermediate transfer belt 107 of the photosensitive drum 102Y and transfer positions to the intermediate transfer belt 107 of the photosensitive drums 102M, 102C, and 102Bk and a conveyance speed of the intermediate transfer belt 107.

In FIG. 6A, images N−1, N, and N+1 are formed in the first image forming mode, and the measuring image is formed between the image N and the image N+1. In FIG. 6A, the measuring image is also formed in the first image forming mode. In FIG. 6B, the images N−1, N, and N+1 are formed in the second image forming mode, and the measuring image is formed between the image N and the image N+1. Herein, in FIG. 6A, the PWM signal of the measuring image of yellow is started to be transferred before the transfer of the PWM signal of black of the image N is completed. This is because change processing for a setting such as switching of an image clock which affects the image formation is not performed since the image formation is executed in the same image forming mode.

Herein, the image clock is a signal for specifying the position in the main scanning direction of each of the pixels constituting the image. It should be noted that a maximum time in which the exposure can be performed per pixel is shortened when a cycle of the image clock is shortened. A time width of the image clock corresponding to the first image forming mode is longer than a time width of the image clock corresponding to the second image forming mode.

On the other hand, the measuring image is formed in the first image forming mode in FIG. 6B. This is because the image forming apparatus 100 according to one or more aspects of the present disclosure has only the measuring image data having 600 dpi. For this reason, in a case where the measuring image is formed while the image forming apparatus 100 continuously forms the plurality of images in the second image forming mode, the ASIC 212 is to execute the change processing after the transfer of the PWM signals corresponding to the images of the respective colors of the image N is ended. The ASIC 212 executes the change processing and completes the switching from the second image forming mode to the first image forming mode. Then, the ASIC 212 transfers the PWM signals generated from the measuring image data to the laser scanner 104. For this reason, a switching time occurs after the transfer of the PWM signals of the image N is ended. Furthermore, after the ASIC 212 completes the transfer of the PWM signals of the respective colors of the measuring image to the laser scanner, the ASIC 212 is to execute the change processing again. Subsequently, after the ASIC 212 executes the change processing and completes the switching from the first image forming mode to the second image forming mode, the ASIC 212 transfers the PWM signals generated from the image data of the image N+1 to the laser scanner 104. For this reason, a switching time occurs after the transfer of the PWM signals of the measuring image is ended.

The image forming apparatus 100 according to one or more aspects of the present disclosure has only the image forming mode corresponding to 600 dpi with regard to not only the measuring image data but also the detection image data. As a result, it is possible to suppress a volume of the measuring image data and a volume of the detection image data, and costs of the recording unit can be reduced. It should be noted that the amount of color misregistration in the second image forming mode can be predicted from the amount of color misregistration of the color misregistration detection image formed in the first image forming mode.

Herein, the timing for forming the measuring image is not necessarily matched with the timing for forming the color misregistration detection image. This is because a cause where the density of the output image fluctuates is different from a cause where the color misregistration occurs. For this reason, the image forming apparatus according to one or more aspects of the present disclosure forms the measuring image each time images for 80 pages are formed in the first image forming mode, for example, and forms the color misregistration detection image each time images for 360 pages are formed. Furthermore, the image forming apparatus forms the color misregistration detection image in a case where a temperature detected by a temperature sensor that is not illustrated in the drawing fluctuates by 3 [° C.] or more, for example, since the color misregistration correction is executed in the previous time.

The switching time does not occur in the first image forming mode even when the measuring image is formed every time 80 pages are formed and the color misregistration detection image is formed every time 360 pages are formed. However, the switching time occurs in each of the timing for forming the measuring image and the timing for forming the color misregistration detection image in the second image forming mode. In view of the above, the image forming apparatus 100 according to one or more aspects of the present disclosure sets the timing such that the measuring image and the color misregistration detection image are formed at the same timing in a case where the plurality of images are continuously formed in the second image forming mode. The image forming apparatus 100 forms the measuring image, for example, each time 360 pages are formed and also forms the color misregistration detection image. According to this configuration, since the measuring image and the color misregistration detection image are formed during a period from the formation of the image N until the formation of the image N+1, it is possible to suppress the switching time.

Figure 7:
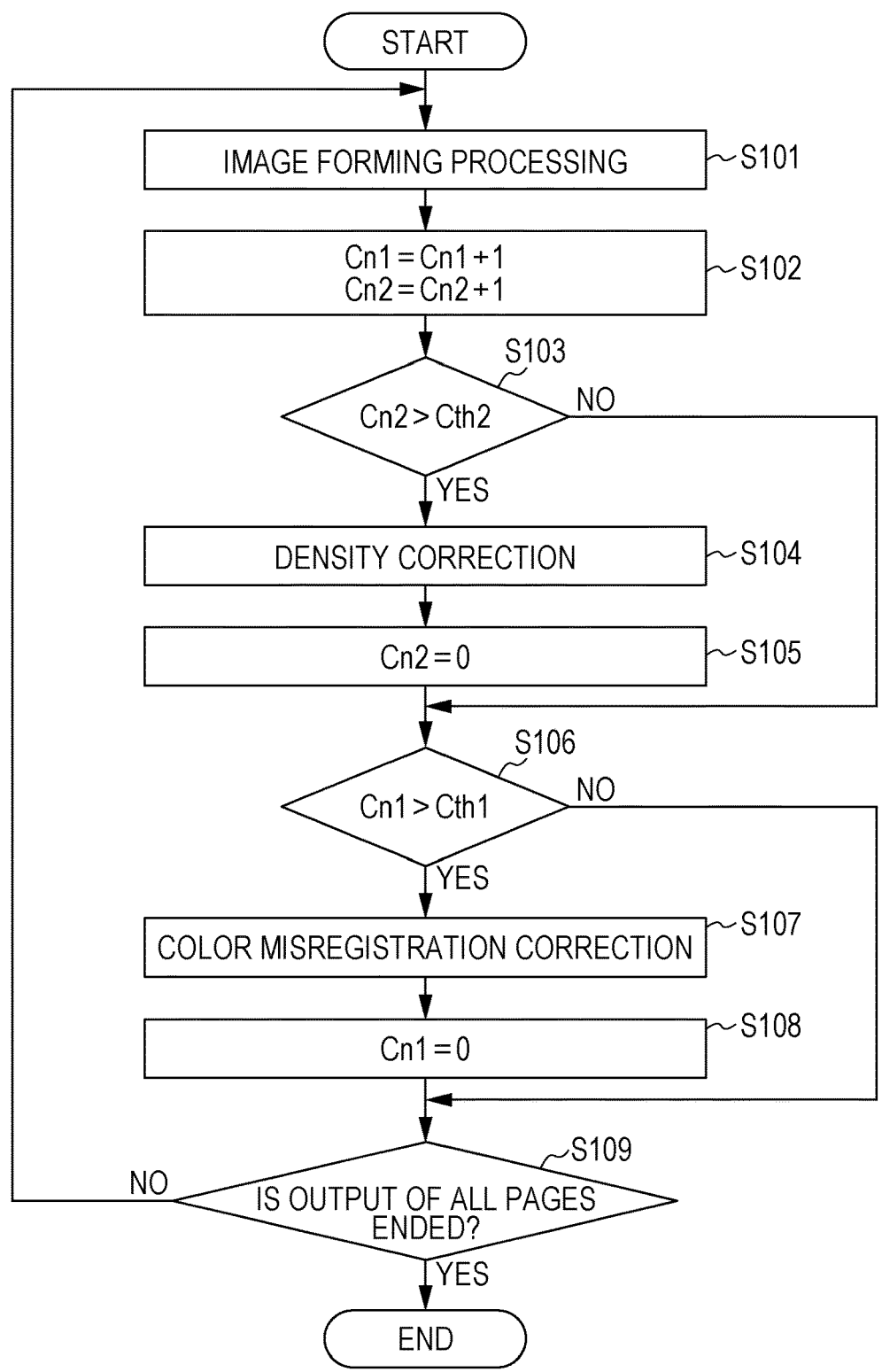
FIG. 7 is a flow chart illustrating image forming processing in an image forming mode at 600 dpi according to one or more aspects of the present disclosure.

Hereinafter, the image forming processing in the first image forming mode will be described with reference to FIG. 7. In a case where the image forming apparatus 100 forms the plurality of images on the basis of the image data, firstly, the CPU 203 forms the image for the first page on the basis of the image data (S101). Subsequently, the CPU 203 increments a count value Cn1 of the counter 206 by 1 and a count value Cn2 of the counter 207 by 1 (S102). In step S102, the counter 206 is a counter configured to count the number of formed sheets so as to determine the timing for forming the color misregistration detection image, and the counter 207 is a counter configured to count the number of formed sheets so as to determine the timing for forming the measuring image.

Next, the CPU 203 determines whether or not the count value Cn2 of the counter 207 is higher than a threshold Cth2 (S103). In step S103, the threshold Cth2 is set as 80. In step S103, when the count value Cn2 is higher than 80, the CPU 203 executes density correction (S104). In a case where the density correction is executed, the CPU 203 reads out the measuring image data from the ROM 204 and causes the image forming unit 101 to form the measuring image on the basis of the measuring image data and the sensor 208 to measure the measuring image. After a measurement result of the sensor 208 is obtained, the gamma generation unit 210 generates the γLUT on the basis of the measurement result to be stored in the memory 201. After the execution of the density correction in step S104, the CPU 203 changes the count value Cn2 to 0 (S105) and shifts to step S106.

On the other hand, in step S103, when the count value Cn2 is lower than or equal to the threshold Cth2, the CPU 203 shifts to step S106. In step S106, the CPU 203 determines whether or not the count value Cn1 of the counter 206 is higher than a threshold Cth1 (S106). In step S106, the threshold Cth1 is set as 360. In step S106, when the count value Cn1 is higher than 360, the CPU 203 executes the color misregistration correction (S107). In a case where the color misregistration correction is executed, the CPU 203 reads out the detection image data from the ROM 204 and causes the image forming unit 101 to form the color misregistration detection image on the basis of the detection image data and the sensor 209 to detect the amount of color misregistration. The registration correction unit 211 corrects the writing start position of the image on the basis of the amount of color misregistration detected by the sensor 209. After the execution of the color misregistration correction in step S107, the CPU 203 changes the count value Cn1 of the counter 206 to 0 (S108) and shifts to step S109. Furthermore, the image forming apparatus 100 executes the color misregistration correction also in a case where an internal temperature of the image forming apparatus fluctuates by 3 [° C.] or more since the color misregistration correction is executed in the previous time. In this case too, the CPU 203 changes the count value Cn1 to 0.

In step S109, the CPU 203 determines whether or not the formation of all the images included in the image data is completed (S109). When the formation of all the images is not completed, the CPU 203 shifts to step S101. When the formation of all the images is completed, the CPU 203 completes the processing of the flow chart in FIG. 7.

As described above, in a case where the images are formed in the first image forming mode, the image forming apparatus 100 forms the color misregistration detection image each time the count value Cn1 exceeds the threshold Cth1. Furthermore, in a case where the images are formed in the first image forming mode, the image forming apparatus 100 forms the measuring image each time the count value Cn2 exceeds the threshold Cth2.

Figure 8:
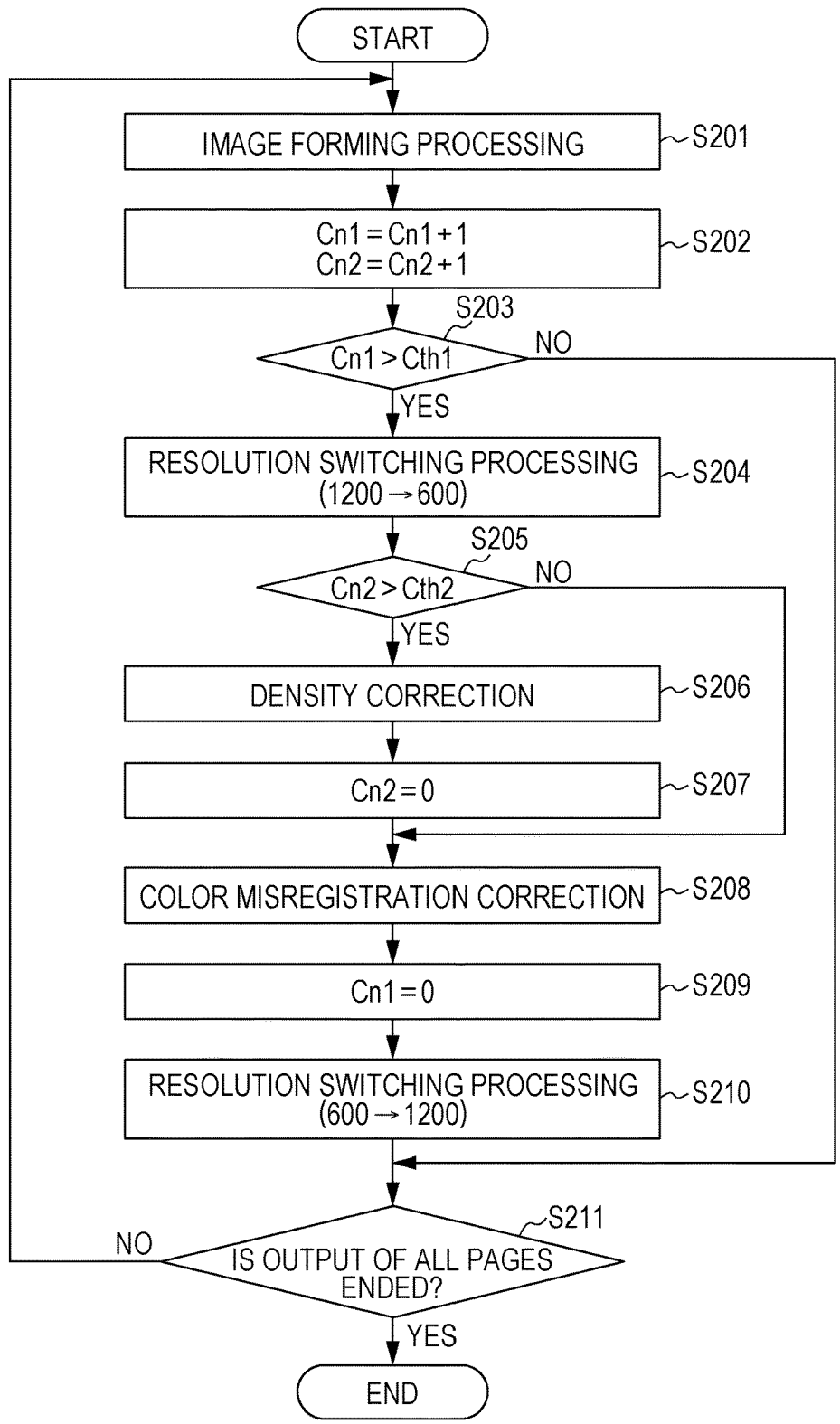
FIG. 8 is a flow chart illustrating the image forming processing in the image forming mode at 1200 dpi according to one or more aspects of the present disclosure.

Next, the image forming processing in the second image forming mode will be described with reference to FIG. 8. In a case where the image forming apparatus 100 forms the plurality of images on the basis of the image data, firstly, the CPU 203 forms the image for the first page on the basis of the image data (S201). Subsequently, the CPU 203 increments the count value Cn1 of the counter 206 by 1 and the count value Cn2 of the counter 207 by 1 (S202).

Next, the CPU 203 determines whether or not the count value Cn1 of the counter 206 is higher than the threshold Cth1 (S203). For example, the threshold Cth1 is set as 360. In step S203, when the count value Cn1 is higher than 360, the CPU 203 executes resolution switching processing (S204). In step S204, the CPU 203 changes the second image forming mode to the first image forming mode to execute the various change processings. The change processing is processing for the dither processing unit 202 to change the screen 202b to the screen 202a and is processing for switching the driving signal conversion unit 212c and the driving signal conversion unit 212a in the ASIC 212, for example.

Next, the CPU 203 determines whether or not the count value Cn2 of the counter 207 is higher than the threshold Cth2 (S205). For example, the threshold Cth2 is set as 80. In step S205, when the count value Cn2 is higher than 80, the CPU 203 executes the density correction (S206). Herein, since the density correction in step S206 is similar processing to the density correction in step S104, descriptions thereof will be omitted. After the execution of the density correction, the CPU 203 changes the count value Cn2 to 0 (S207).

Subsequently, after the execution of the density correction, the CPU 203 executes the color misregistration correction without changing the image forming mode (S208). Herein, since the color misregistration correction in step S208 is similar processing to the color misregistration correction in step S107, descriptions thereof will be omitted. After the execution of the color misregistration correction, the CPU 203 changes the count value Cn1 to 0 (S209). After the execution of the color misregistration correction processing, the CPU 203 executes the resolution switching processing (S210). In step S210, the CPU 203 changes the first image forming mode to the second image forming mode and executes the various change processings. The change processing is processing for the dither processing unit 202 to change the screen 202a to the screen 202b and the processing for the ASIC 212 to switch the driving signal conversion unit 212a and the driving signal conversion unit 212c, for example.

Furthermore, the image forming apparatus 100 executes the color misregistration correction also in a case where the internal temperature of the image forming apparatus fluctuates by 3 [° C.] or more since the color misregistration correction is executed in the previous time. In this case too, the CPU 203 executes the resolution switching processing and switches the mode from the second image forming mode to the first image forming mode. Similarly as described above, after the execution of the color misregistration correction, the CPU 203 executes the resolution switching processing and switches the mode from the first image forming mode to the second image forming mode. In this case too, the CPU 203 changes the count value Cn1 to 0.

Next, the CPU 203 determines whether or not the formation of all the images included in the image data is completed (S211). When the formation of all the images is not completed, the CPU 203 shifts to step S201. When the formation of all the images is completed, the CPU 203 completes the processing of the flow chart in FIG. 8.

As described above, in a case where the images are formed in the second image forming mode, the image forming apparatus 100 forms the color misregistration detection image each time the count value Cn1 exceeds the threshold Cth1. Furthermore, in a case where the images are formed in the second image forming mode, the image forming apparatus 100 forms the measuring image when the count value Cn1 exceeds the threshold Cth1 and also the count value Cn2 exceeds the threshold Cth2. That is, in a case where the images are formed in the second image forming mode, the image forming apparatus 100 does not form the measuring image unless the count value Cn1 exceeds the threshold Cth1.

Figure 9:
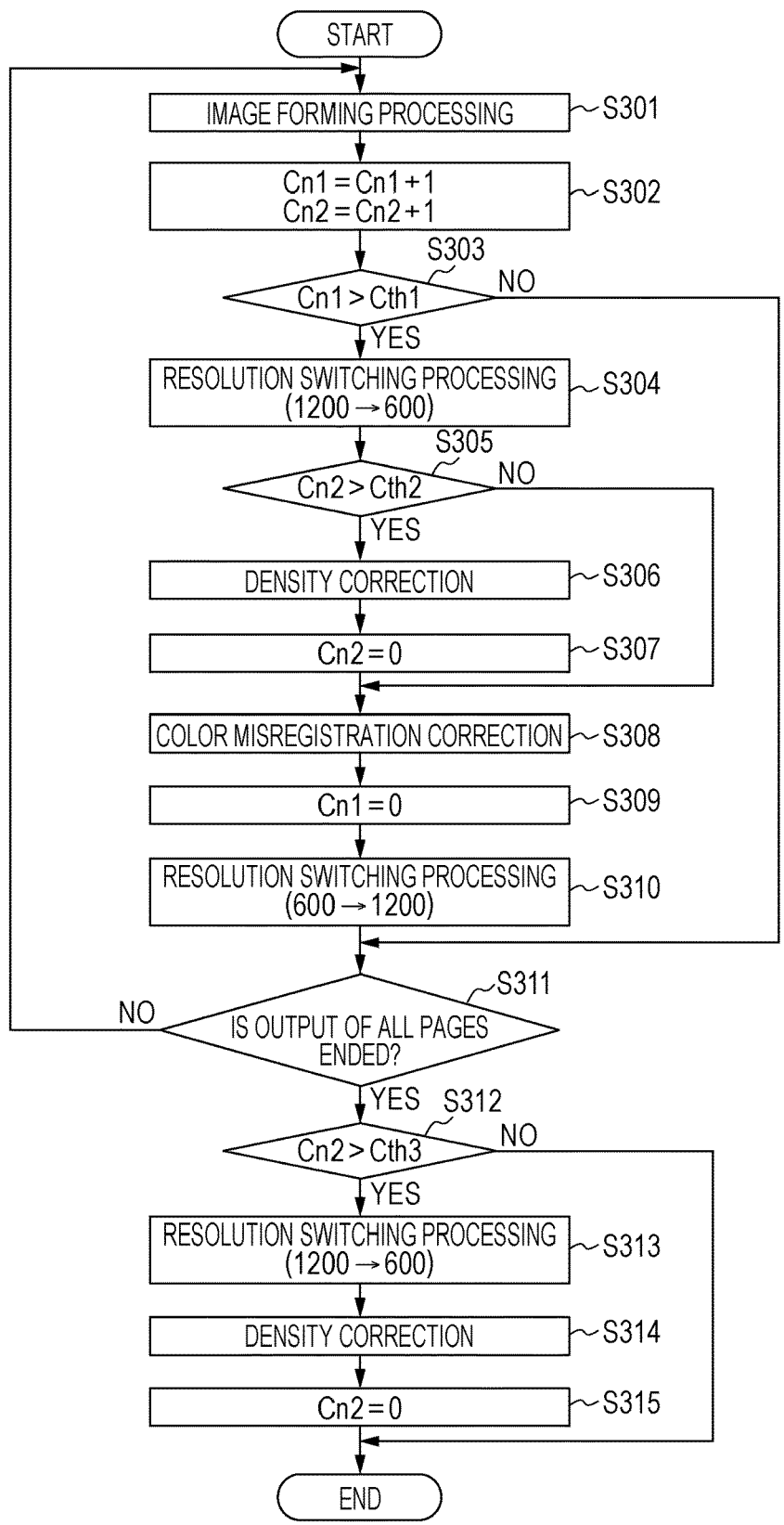
FIG. 9 is a flow chart illustrating the image forming processing in the image forming mode at 1200 dpi according to one or more aspects of the present disclosure.

FIG. 9 is an explanatory diagram for describing another exemplary embodiment of the image forming processing in the second image forming mode. The flow from step S301 to step S311 is the same as the flow from step S201 to step S211 in FIG. 8. Hereinafter, descriptions will be given of step S312 to step S315 in FIG. 9.

After the formation of all the images is completed in step S311, the CPU 203 determines whether or not the count value Cn2 is higher than a threshold Cth3 (S312). The threshold Cth3 is set, for example, as 50 (predetermined value). That is, the threshold Cth3 is set as a value lower than the threshold Cth2. In step S312, when the count value Cn2 is lower than or equal to the threshold Cth3, the processing of the flow chart in FIG. 9 is ended.

On the other hand, when the count value Cn2 is higher than the threshold Cth3 in step S312, the CPU 203 executes the resolution switching processing (S313). In step S313, the CPU 203 changes the second image forming mode to the first image forming mode to execute the various change processings. Subsequently, the CPU 203 executes the density correction (S314). After the execution of the density correction in step S314, the CPU 203 changes the count value Cn2 to 0 (S315) and ends the processing of the flow chart in FIG. 9.

In a case where the image forming apparatus 100 forms the image in the second image forming mode, the CPU 203 may form the measuring image in a case where the internal temperature fluctuates by 3 [° C.] or more since the color misregistration correction is executed in the previous time and also the count value Cn2 exceeds the threshold Cth2. That is, the image forming apparatus 100 does not form the measuring image unless the count value Cn1 exceeds the threshold Cth1 or the internal temperature fluctuates by a temperature higher than or equal to a predetermined temperature in the second image forming mode. According to this configuration, since the measuring image can be formed when the count value Cn2 exceeds the threshold Cth2 not only in a case where the count value Cn1 exceeds the threshold Cth1 but also in a case where the internal temperature fluctuates, it is possible to further suppress the density fluctuation while the second image forming mode is executed.

According to one or more aspects of the present disclosure of the present disclosure, since only the measuring image data and the detection image data appropriate to the first image forming mode are stored in the ROM 204, a storage capacity of the ROM 204 can be set to be small, and it is possible to reduce the costs of the image forming apparatus 100. Furthermore, in a case where the images are formed in the second image forming mode, the image forming apparatus 100 does not form the measuring image unless the count value Cn1 exceeds the threshold Cth1 and also the count value Cn2 exceeds the threshold Cth2, the occurrence of the switching time can be suppressed.

The image forming apparatus 100 stores the measuring image data corresponding to a predetermined resolution. Subsequently, the image forming apparatus 100 does not form the measuring image at all of the resolutions. For this reason, the image forming apparatus 100 can suppress the storage capacity of the storage unit as compared with the configuration in which the measuring images corresponding to all of the resolutions are stored. Furthermore, the image forming apparatus 100 can suppress the costs of the storage unit as compared with the configuration in which the measuring images corresponding to all of the resolutions are stored.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-200407 filed Oct. 11, 2016, which is hereby incorporated by reference herein in its entirety.

What is claimed is:

1. An image forming apparatus comprising:
a plurality of image forming units configured to form a plurality of images having different colors based on image data;
a first sensor configured to detect a color pattern formed on an intermediate transfer member, the color pattern being used for detecting a color misregistration;
a second sensor configured to measure a measuring image; and a controller configured to control the plurality of image forming units to form a plurality of color patterns having different colors on the intermediate transfer member, control the first sensor to detect an amount of color misregistration related to a relative position of a color pattern having a reference color among the plurality of color patterns and a color pattern having another color among the plurality of color patterns, determine an offset value for adjusting an image writing start timing of the other color different from the reference color based on the amount of color misregistration detected by the first sensor, control the plurality of image forming units to form the measuring image on the intermediate transfer member, control the second sensor to measure the measuring image, and determine an image forming condition for adjusting densities of images to be formed by the plurality of image forming units based on a measurement result of the second sensor, wherein:

the controller controls the image forming apparatus based on an image forming mode corresponding to the image data;

the controller controls the plurality of image forming units to form the plurality of color patterns in a case where a first condition is satisfied in a first image forming mode;

the controller controls the plurality of image forming units to form the measuring image in a case where a second condition is satisfied in the first image forming mode;

the controller controls the plurality of image forming units to form the measuring image and the plurality of color patterns in a case where both the first condition and the second condition are satisfied in a second image forming mode;

the controller skips the image formation of the measuring image when the first condition is not satisfied in the second image forming mode irrespective of a state of the second condition; and the first condition is different from the second condition.

2. The image forming apparatus according to claim 1, wherein the first condition is satisfied in a case where a number of sheet on which an output image is formed after the plurality of color patterns are formed in a previous time reaches a first number, wherein the second condition is satisfied in a case where a number of sheet on which an output image is formed after the measuring image is formed in a previous time reaches a second number, and wherein the first number is different from the second number.

3. The image forming apparatus according to claim 2, wherein the second number is lower than the first number.

4. The image forming apparatus according to claim 1, wherein the controller controls the plurality of image forming units to form the plurality of color patterns in a case where the first condition is satisfied in the second image forming mode.

5. The image forming apparatus according to claim 1, wherein the controller controls the plurality of image forming units to form the measuring image and controls the plurality of image forming units to form the plurality of color patterns in a case where both the first condition and the second condition are satisfied in the second image forming mode.

6. The image forming apparatus according to claim 1, wherein the image data includes information related to a resolution, and wherein the controller selects the image forming mode based on the information.

7. The image forming apparatus according to claim 1, wherein the controller controls the image forming apparatus based on the first image forming mode in a case where a resolution of the image data is equivalent to a first resolution, wherein the controller controls the image forming apparatus based on the second image forming mode in a case where the resolution of the image data is equivalent to a second resolution, and wherein the second resolution is higher than the first resolution.

8. The image forming apparatus according to claim 1, further comprising an image processor configured to execute image processing on the image data, wherein the plurality of image forming units form the plurality of images based on the image data on which the image processing is executed by the image processor, wherein the image processor executes first image processing on the image data in the first image forming mode, and wherein the image processor executes second image processing on the image data in the second image forming mode.

9. The image forming apparatus according to claim 8, wherein the image processor converts the image data based on a first conversion condition in a case where the image processor executes the first image processing, wherein the image processor converts the image data based on a second conversion condition in a case where the image processor executes the second image processing, and wherein the first conversion condition is different from the second conversion condition.

10. The image forming apparatus according to claim 8, wherein the image processor executes thinning-out processing on the image data in a case where the image processor executes the second image processing.

11. The image forming apparatus according to claim 10, wherein the image processor does not execute the thinning-out processing on the image data in a case where the image processor executes the first image processing.

12. The image forming apparatus according to claim 10, wherein the image forming unit includes a photosensitive member arranged to rotate, and a laser scanner including a light source configured to emit laser light, a rotating polygon mirror that deflects the laser light, and a motor configured to rotate the rotating polygon mirror, wherein the laser light deflected by the rotating polygon mirror scans the photosensitive member to form an electrostatic latent image, wherein the image forming unit develops the electrostatic latent image and forms the image, wherein the image processor does not execute the thinning-out processing in a first scanning direction in which the laser light scans the photosensitive member, and wherein the image processor executes the thinning-out processing in a second scanning direction orthogonal to the first scanning direction.

13. The image forming apparatus according to claim 1,
wherein the image forming unit includes
a photosensitive member arranged to rotate, and
a laser scanner including a light source configured to emit laser light, a rotating polygon mirror that deflects the laser light, and a motor configured to rotate the rotating polygon mirror,
wherein the laser light deflected by the rotating polygon mirror scans the photosensitive member to form an electrostatic latent image,
wherein the image forming unit develops the electrostatic latent image and forms the image,
wherein a rotating speed of the photosensitive member in the first image forming mode corresponds to a first rotating speed,
wherein the rotating speed of the photosensitive member in the second image forming mode corresponds to the first rotating speed,
wherein a rotating speed of the rotating polygon mirror in the first image forming mode corresponds to a second rotating speed, and
wherein the rotating speed of the rotating polygon mirror in the second image forming mode corresponds to the second rotating speed.

14. The image forming apparatus according to claim 1, further comprising a temperature sensor configured to detect a temperature,
wherein the controller controls the plurality of image forming units based on the temperature detected by the temperature sensor to control whether or not the plurality of color patterns are formed.

15. The image forming apparatus according to claim 14,
wherein the controller controls the plurality of image forming units to form the plurality of color patterns when a difference between a temperature at which the plurality of color patterns are formed in a previous time and a current temperature is higher than a predetermined temperature.

16. An image forming apparatus that forms images having different resolution on a sheet, comprising:
an image processor configured to perform image processing corresponding to a resolution to image data;
a plurality of image forming units configured to form images having different colors based on the image data to which the image processing is performed by the image processor, wherein the plurality of image forming units includes a first image forming unit configured to form a first image having a first color and a second image forming unit configured to form a second image having a second color different from the first color;
an intermediate transfer member to which the images formed by the plurality of image forming units are transferred;
a transfer configured to transfer the images from the intermediate transfer member to the sheet;
sensor configured to measure a color pattern on the intermediate transfer member and measure a measuring image on the intermediate transfer member; and
a controller configured to:
control the first image forming unit and the second image forming unit to form the color pattern;
control the sensor to measure the color pattern on the intermediate transfer member;
control a relative position of a first image to be formed by the first image forming unit and a second image to be formed by the second image forming unit based on a measurement result of the color pattern by the sensor;
control the first image forming unit and the second image forming unit to form the measuring image:
control the sensor to measure the measuring image on the intermediate transfer member; and
control a first image forming condition for adjusting density of the first image to be formed by the first image forming unit, and a second image forming condition for adjusting density of the second image to be formed by the second image forming unit based on a measurement result of the measuring image by the sensor;
wherein:
in a case where a first condition related to a usage status of the image forming apparatus is satisfied while images having a first resolution are continuously formed, the controller controls the first image forming unit and the second image forming unit to form the color pattern,
in a case where a second condition related to the usage status of the image forming apparatus is satisfied while the images having the first resolution are continuously formed, the controller controls the first image forming unit and the second image forming unit to form the measuring image,
the second condition is different from the first condition,
in a case where the first condition is satisfied while images having a second resolution different from the first resolution are continuously formed, the controller controls the first image forming unit and the second image forming unit to form the color pattern and the measuring image, and
in a case where the second condition is satisfied while the images having the second resolution are continuously formed, the controller does not form the measuring image.

17. The image forming apparatus according to claim 16,
wherein the first condition is satisfied every time a number of sheets on which the images are formed by the image forming apparatus reaches a first number, and
wherein the second condition is satisfied every time the number of sheets on which the images are formed by the image forming apparatus reaches a second number smaller than the first number.

18. The image forming apparatus according to claim 16, wherein the first resolution is lower than the second resolution.

19. The image forming apparatus according to claim 16,
wherein the image processing includes a conversion processing that converts the image data based on a conversion condition corresponding to the resolution and thinning-out processing,
wherein in a case where an image having the first resolution is formed, the image processor does not perform thinning-out processing to the image data, and
wherein in a case where an image having the second resolution is formed, the image processor performs thinning-out processing to the image data.

20. The image forming apparatus according to claim 16,
wherein the image processor is controlled based on a mode corresponding to the resolution, and
wherein in a case where the first condition is satisfied while images having the second resolution are continuously formed, the controller controls the image processor to operate in a mode corresponding to the first resolution to form the measuring image and the color pattern.

* * * * *